J. G. TALMAGE.
GAGE GLASS CONNECTION.
APPLICATION FILED DEC. 6, 1911.
1,046,234.
Patented Dec. 3, 1912.
2 SHEETS—SHEET 1.
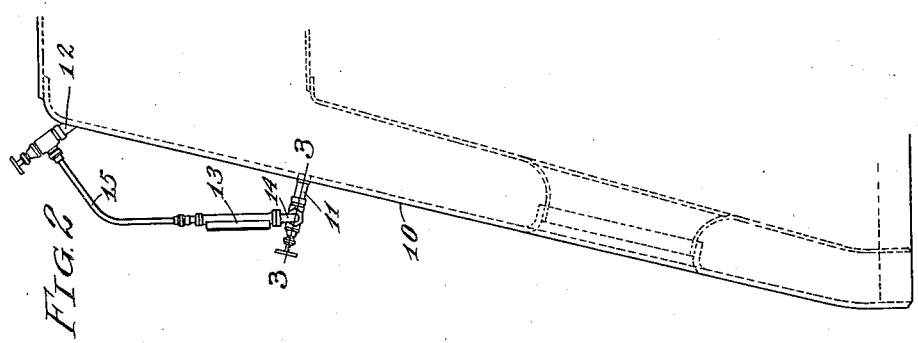
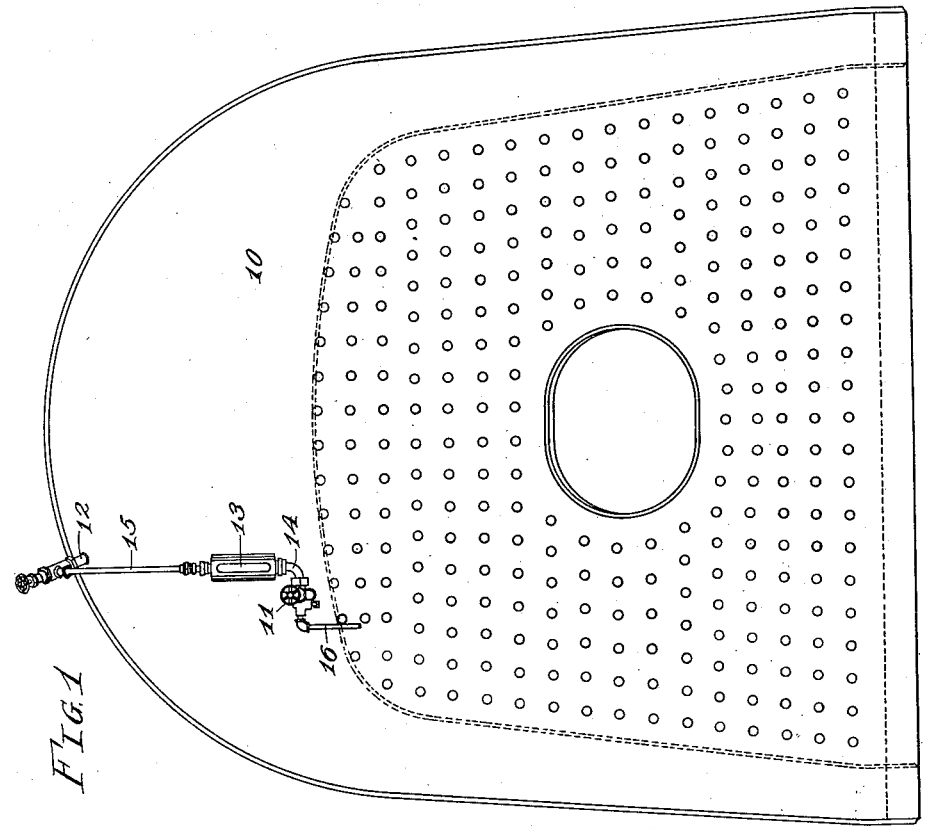
WITNESSES:
INVENTOR
John G. Talmage
BY
Albert H. Bates,
ATTORNEY

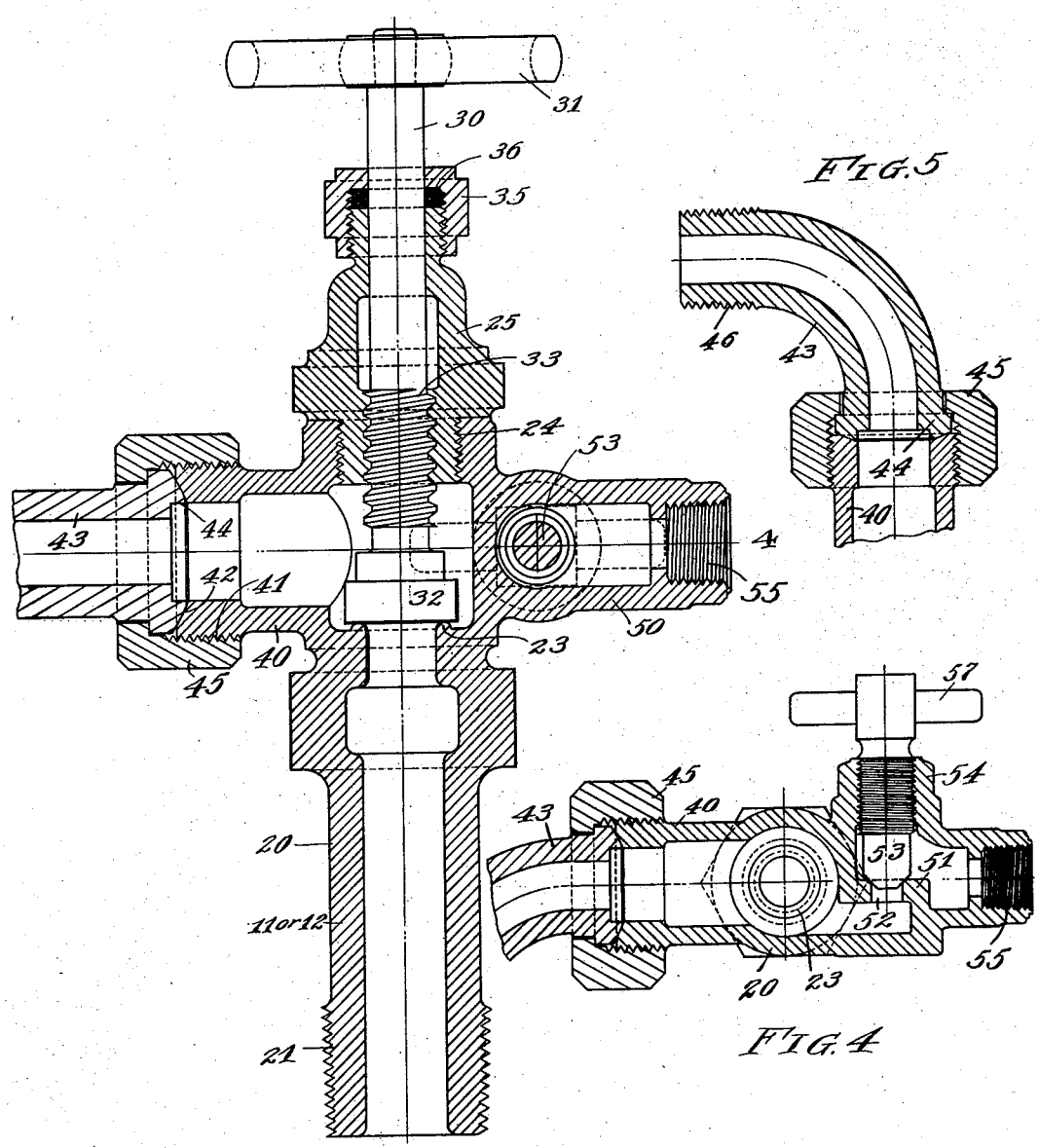

UNITED STATES PATENT OFFICE.

JOHN G. TALMAGE, OF CLEVELAND, OHIO.

GAGE-GLASS CONNECTION.

1,046,234.  Specification of Letters Patent.  Patented Dec. 3, 1912.

Application filed December 6, 1911. Serial No. 664,210.

*To all whom it may concern:*

Be it known that I, JOHN G. TALMAGE, a citizen of the United States, residing at Cleveland, in the county of Cuyahoga and State of Ohio, have invented a certain new and useful Improvement in Gage-Glass Connections, of which the following is a full, clear, and exact description, reference being had to the accompanying drawings.

This invention relates to connections for gage glasses such as are employed with steam boilers to indicate the water level.

The object of the invention is to provide a connection enabling a vertical glass to be effectively and simply connected with a portion of a boiler, whether the same is vertical or not. In locomotive boilers particularly, it is customary to make the end of the boiler adjacent to the fire box inclined or rounded, and my invention provides valve connections so that a vertical gage glass can be effectively connected with such boiler.

The invention is hereinafter more fully described and its essential characteristics are summarized in the claims.

In the drawings, Figure 1 is an end view of a locomotive boiler equipped with my attachment; Fig. 2 is a side elevation of the attachment and portion of the boiler; Fig. 3 is a central section through one of the valve connections, as indicated by the line 3—3 in Fig. 2; Fig. 4 is a cross section of the connector, as indicated by the line 4—4 of Fig. 3,—Fig. 4 being on a scale reduced from that of Fig. 3; Fig. 5 is a view of the elbow coöperating with my connector.

As shown in Figs. 1 and 2, 10 represents the outer sheet of the boiler, 11 and 12 two of my valved connectors secured thereto at different angles, 13 the gage glass with its guard, 14 an elbow connecting such glass with the connector 11, 15 a bent pipe connecting the glass with the connector 12.

16 indicates a drip pipe from the connector 11.

I will refer now to Figs. 3 and 4, which illustrate the particular construction of the connectors. As shown in these views, 20 indicates a tubular casing having screw threads 21 by which it is screwed into the boiler. Internally this casing has a valve seat 23 and opposite the seat an internally screw threaded portion 24. 25 indicates a cap which has a screw threaded extension screwing into the threaded portion 24 of the casing: 30 indicates the stem of the valve, which is provided at its outer end with an operating handle 31 and at its inner end with the plug 32. On the exterior of the stem are formed large threads 33 which coöperate with corresponding internal threads in the cap 25. Accordingly, the turning of the handle seats the plug 32 on the seat 23 or raises it therefrom. A stuffing box is provided by means of the cap 35 screwing onto an externally threaded extension of the cap 25 and internal packing 36. The casing 20 has a lateral extension 40 of the chamber occupied by the valve plug, this extension being made tubular and provided with external threads 41 and a dish-shaped end 42. 43 indicates a tubular member having a flanged head 44 with a convex face adapted to seat against the end 42, and surrounding this tubular member is the internally threaded collar 45 screwing onto the threads 41 and overhanging the head 44. The member 43 forms the means for connecting the casing with the gage glass or a pipe thereto. For example, this member may be straight, as shown near the top of Fig. 2 and in Fig. 3, or it may be bent into an elbow shape, as shown at 14 in Fig. 1 and in Figs. 4 and 5, and be connected directly with the gage glass. In either case the connection with the glass may be by a nut engaging threads on the other end of the member 43, as the threads 46 in Fig. 5. In the opposite side of the valve casing of the extension 40 I provide a draining extension 50. This extension has an internal diaphragm 51 having an opening 52 in which is adapted to seat the end of a plug 53 which is screw threaded in an internally threaded boss 54 in the side of the casing. The portion of the chamber on the plug-side of the diaphragm terminates in the threadeed opening 55, which is adapted to receive the drip pipe, as indicated by 16 in Fig. 1. A handle 57 on the plug 53 furnishes convenient means for turning it to withdraw it from its seat whenever it is desired to drain or blow out the glass.

My construction having the extension 43 connected with the side of the valve casing enables a direct connection to a vertical gage glass, even though the casing may not be in a horizontal position. Neither of the casings shown in Figs. 1 and 2 are horizontal, but the connection is made very easily and directly to the vertical gage glass. The nut 45 clamps the elbow 14 or the leading pipe 15, as the case may be, directly to the casing. In either case, the connector is in the nature of an elbow, though the pipe 15 is shown as somewhat longer. While my connector is adapted for boilers having various inclines or curves, it is equally useful in connection with a vertical wall of a boiler, in which case the elbow may be employed, if desired, or the casing may be turned ninety degrees to cause the connection 43 to extend upwardly or downwardly and a straight connection made therefrom to the gage glass. The great adaptability of my connector to the varying conditions existing in practice is one of its valuable features.

Having thus described my invention, what I claim is:

1. The combination, with a boiler, of a casing connected therewith and having an internal valve seat, a plug for controlling said seat, an extension of the case at one side of the valve chamber, a gage glass, an elbow connecting said extension to the gage glass, another extension from the chamber on the other side, a diaphragm in such extension, and a screw plug controlling an opening in the diaphragm.

2. The combination of a boiler sheet out of a vertical plane, a pair of casings secured to the sheet at an angle to each other and each having a valve seat, a valve plug for controlling each seat, a lateral opening at the side of one casing, an elbow connected with said opening and lying in a vertical plane, a gage glass connected at its lower end with said elbow, and a connection between the upper end of the gage glass and the other casing.

3. The combination, with a boiler, of a casing adapted to be screw threaded thereinto and having a bore and a valve seat, a valve plug for controlling said seat, an opening in the side of the casing, a screw threaded collar surrounding the wall of said opening, an elbow adjustably clamped by said collar against the end of the wall and lying in a vertical plane, and a gage glass out of alinement with the casing and seating at its lower end on the upper end of the elbow.

In testimony whereof, I hereunto affix my signature in the presence of two witnesses.

JOHN G. TALMAGE.

Witnesses:
ALBERT H. BATES,
BRENNAN B. WEST.